(12) United States Patent
Deng et al.

(10) Patent No.: US 7,880,404 B2
(45) Date of Patent: Feb. 1, 2011

(54) CONTROLLING CURRENT THROUGH SERIAL LEDS USING A LOW VOLTAGE TRANSISTOR WHEN USING A HIGH VOLTAGE DRIVER

(75) Inventors: Qi Deng, San Jose, CA (US); Hardik D. Patel, Milpitas, CA (US)

(73) Assignee: Micrel, Inc., San Jose, CA (US)

( * ) Notice: Subject to any disclaimer, the term of this patent is extended or adjusted under 35 U.S.C. 154(b) by 573 days.

(21) Appl. No.: 12/020,458

(22) Filed: Jan. 25, 2008

(65) Prior Publication Data
US 2009/0189539 A1    Jul. 30, 2009

(51) Int. Cl.
*G05F 1/00* (2006.01)
(52) U.S. Cl. .................. 315/291; 315/307; 315/308; 315/247; 315/224; 315/299; 315/312; 345/77; 345/102; 345/212; 345/46
(58) Field of Classification Search .............. 315/291, 315/297, 299, 247, 250, 224, 226, 308, 312, 315/192, 193, 185 R; 345/46, 82, 83, 77, 345/102, 212; 323/222, 224, 271, 344
See application file for complete search history.

(56) References Cited

U.S. PATENT DOCUMENTS

| 7,317,403 | B2 * | 1/2008 | Grootes et al. | 340/815.45 |
| 7,423,389 | B2 * | 9/2008 | Lee | 315/308 |
| 7,439,945 | B1 * | 10/2008 | Awalt et al. | 345/83 |
| 7,550,934 | B1 * | 6/2009 | Deng et al. | 315/308 |
| 7,746,300 | B2 * | 6/2010 | Zhang et al. | 345/82 |
| 2008/0116818 | A1 * | 5/2008 | Shteynberg et al. | 315/192 |

* cited by examiner

*Primary Examiner*—Haissa Philogene
(74) *Attorney, Agent, or Firm*—Patent Law Group LLP; Brian D. Ogonowsky (57) ABSTRACT

Various circuits are described herein where a series transistor used to control current through a string of LEDs, driven by a high voltage, is not subjected to the high voltage when the transistor is turned off pursuant to a PWM signal. To avoid the transistor experiencing the high voltage, the HV regulator is disabled shortly before the transistor is turned off and is enabled shortly after the transistor has turned back on. Control circuits for controlling the regulator and transistor include delay circuits and/or voltage sensing circuits to ensure that the transistor is always on prior to the voltage regulator being enabled pursuant to the incoming PWM signal, and the voltage regulator is always disabled when the first transistor is off pursuant to the incoming PWM signal.

25 Claims, 9 Drawing Sheets

CONTROLLING CURRENT THROUGH SERIAL LEDS USING A LOW VOLTAGE TRANSISTOR WHEN USING A HIGH VOLTAGE DRIVER

FIELD OF THE INVENTION

This invention relates to light emitting diode (LED) drivers and, in particular, to an LED driver that includes a relatively high voltage regulator that drives multiple LEDs in series at a specified current level.

BACKGROUND

LEDs are rapidly replacing incandescent bulbs, fluorescent bulbs, and other types of light sources due to their efficiency, small size, high reliability, and selectable color emission. A typical forward voltage drop for a high power LED is about 3-4 volts. The brightness of an LED is controlled by the current through the LED, which ranges from only a few milliamps to an amp or more, depending on the type of LED. For this reason, LED drivers typically include some means to control the current.

In some applications, such as backlights for large televisions, many LEDs of various colors, such as red, green, and blue, are used to achieve the desired brightness and overall color temperature. It is common to connect LEDs in series, since the current through all the LEDs in series will be the same. If the LEDs in a string are matched, each LED in the string will have similar light emission characteristics. For a color LCD display, there may be one driver for a string of red LEDs, a second driver for a string of green LEDs, and a third driver for a string of blue LEDs, where each string has a specified current to achieve the desired white point. Serial strings of LEDs may also be connected in parallel so as to limit the required driving voltage level and provide redundancy.

In some large display applications, there may be 25 or more LEDs connected in series, requiring a driving voltage of about 90 volts (about 25×3.5 volts). Such high voltages require components with a breakdown voltage well in excess of 90 volts.

Figure 1:
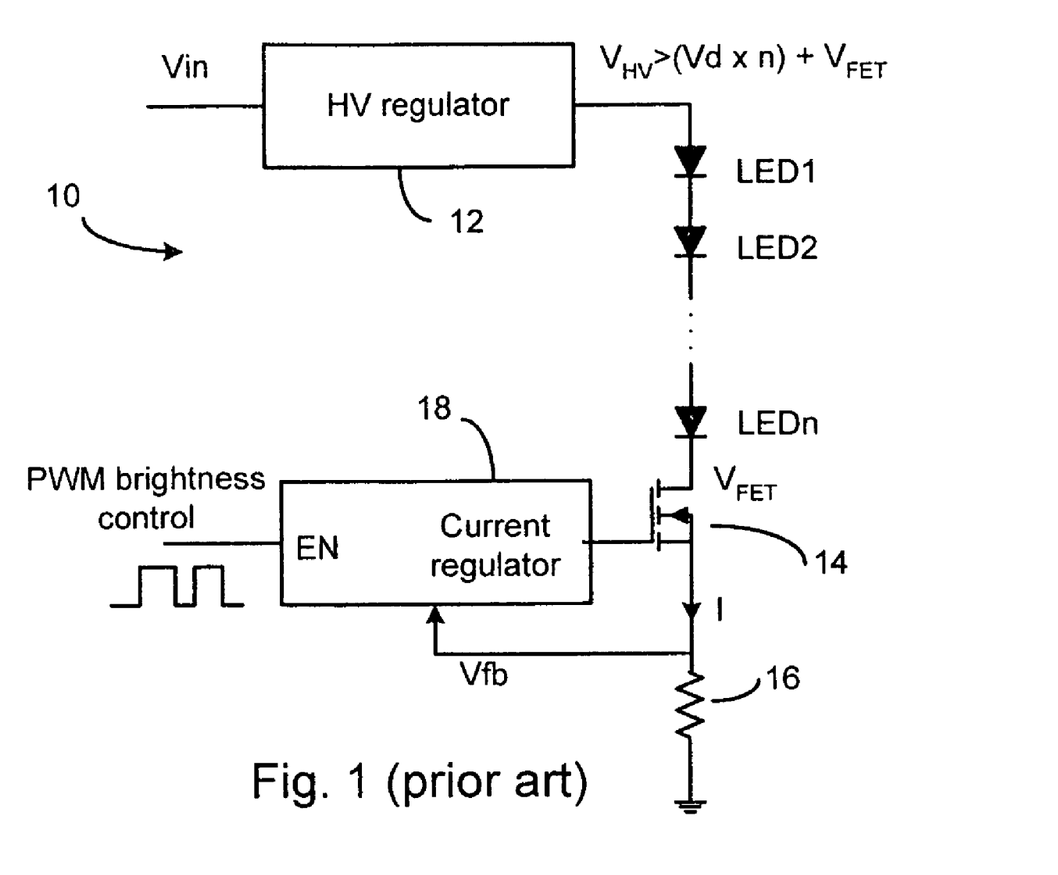
FIG. 1 is a schematic diagram of a prior art LED driver.

FIG. 1 illustrates a conventional simple driver 10 for a string of LEDs, LED1-LEDn. Assume n=25. There may be many parallel strings of LEDs, all connected to the same high voltage, provided by a high voltage (HV) regulator 12, where each string may have a separate current controller. The conventional HV regulator 12 converts an input voltage Vin to a regulated voltage of a predetermined level. The input voltage Vin may be any voltage, such as a low battery voltage or a rectified wall outlet voltage. In the example of FIG. 1, it is assumed the regulator 12 outputs a DC voltage of 90 volts or more. The regulator 12 may be a buck or boost regulator, depending on the required input and output voltages.

To control the current through the LEDs, for brightness control and to avoid damage, the LEDs are coupled to ground via an FET 14 and a low value resistor 16. The current through the LEDs produces a voltage drop across the resistor 16, which is used as a feedback voltage Vfb to detect the current. The gate voltage of the FET 14 is adjusted by a current regulator 18 so that the feedback voltage Vfb matches a fixed reference when the FET 14 is turned on. Thus, the value of the resistor 16 can be used to set the maximum current through the LEDs.

To control the brightness of the LEDs, the average current through the LEDs is controlled by pulse width modulation (PWM), where the duty cycle (on time vs. total time) of the pulses determines the average current. For example, if the duty cycle were 50%, the average current would be half of the instantaneous current when the FET 14 is on. Thus, the perceived brightness of the LEDs would be, for example, half the brightness of the LEDs when fully on. The PWM signal is typically generated by a processor or other controller and changes when a different brightness is desired. The PWM frequency may be, for example, 1 kHz, so the light flicker is not perceptible.

When the FET 14 is on, the voltage across the FET 14 is very small, since the FET 14 acts like a short circuit. However, when the FET 14 is off, the voltage across the FET 14 is approximately the full drive voltage of 90 volts, since there is very little voltage drop across the LEDs due to no current flowing through the LEDs. This requires a very large FET that can withstand a breakdown voltage well in excess of 90 volts. Such large FETs are relatively expensive and less efficient than smaller FETs.

It would be desirable to drive a string of LEDs using a high voltage but where the FET (or other type of switch) that controls the current does not need a high breakdown voltage to support the full drive voltage.

SUMMARY

Various circuits are described herein where the transistor used to control current through a string of LEDs driven by a high voltage is not subjected to the high voltage when the transistor is turned off pursuant to a PWM signal. To avoid the transistor experiencing the high voltage, the HV regulator is disabled shortly before the transistor is turned off and is enable shortly after the transistor has turned back on.

In one embodiment, a low state of the incoming PWM signal, such as from a microprocessor, causes a disable signal to be applied to an enable terminal of the HV regulator, turning off the regulator, after a first fixed delay time, using a first delay circuit. A second delay circuit for the transistor causes the transistor to turn off a short time later. When the incoming PWM signal goes high, this signal almost immediately turns the transistor back on while the HV regulator is disabled. The high incoming PWM signal is delayed by the first delay circuit to cause an enable signal to be applied to the enable terminal of the HV regulator to turn it back on after the transistor has already been turned back on.

In another embodiment, when the incoming PWM signal goes low, a voltage is sensed between the transistor and a low value resistor connected to ground. The transistor is not turned off until it is determined that the HV regulator has been disabled by sensing that the voltage has been pulled to ground (i.e., no current through the resistor). By using this feedback technique, no delay circuit is required for controlling the transistor. The transistor is turned back on pursuant to a high incoming PWM signal, and the HV regulator is then turned back on after a short delay by a delay circuit.

In another embodiment, the voltage at both terminals of the transistor is sensed while the transistor is being controlled by the PWM signal. The HV regulator is disabled when the incoming PWM signal goes low. The transistor is only turned off when the incoming PWM signal is low and the lower terminal voltage is logically low (HV regulator already turned off). The transistor is turned on when the incoming PWM signal goes high. The HV regulator is only enabled when the PWM signal goes high and the upper terminal voltage goes logically low (transistor already turned on).

Any combinations of the circuits can be used, and the technique can be used with any type of switch (FET, bipolar transistor, SCR, etc.). Any number of parallel strings of LEDs may be simultaneously controlled using the above techniques. The HV regulator can be turned off in any manner.

BRIEF DESCRIPTION OF THE DRAWINGS

Elements labeled with the same numeral in the various figures may be the same or equivalent.

DETAILED DESCRIPTION

Figure 2:
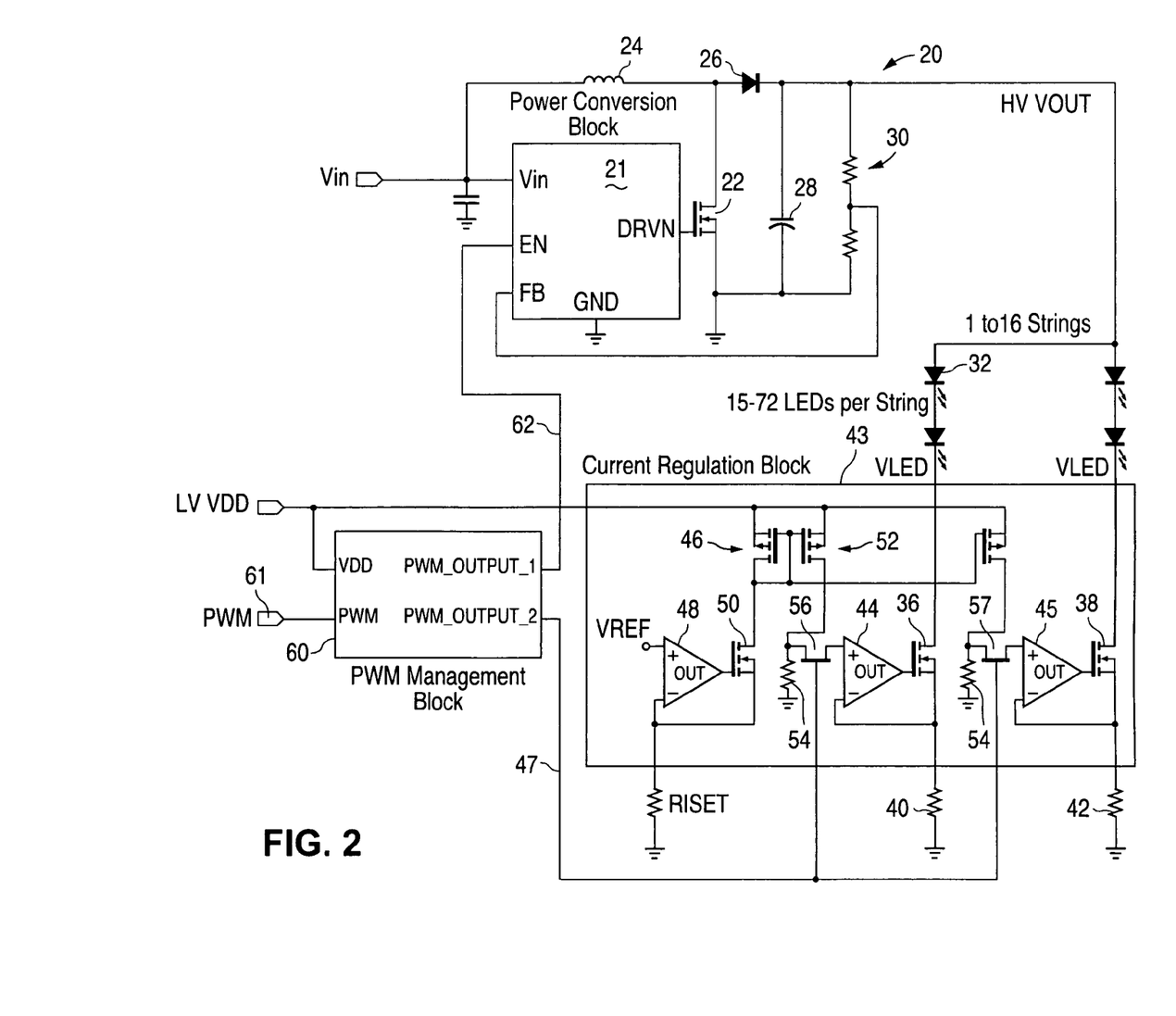
FIG. 2 is a high level circuit diagram of one embodiment of the invention using delay circuits (shown in FIG. 3).

FIG. 2 illustrates one embodiment of the invention.

Power Conversion Block 21/Regulator 20

A conventional voltage regulator 20 comprises a power conversion block 21 (a switching controller) and an output circuit. The block 21 receives a power supply input voltage Vin and outputs a voltage needed to turn on all the LEDs connected to it. In the example of FIG. 2, the regulator 20 is configured as a boost regulator to boost Vin to the desired voltage. The power conversion block 21 is sold by many companies, including Micrel, Inc., as a single packaged integrated circuit. One suitable regulator controller is the MIC2196 by Micrel, whose data sheet is incorporated herein by reference.

Generally, in a boost regulator, a high frequency PWM signal (e.g., 100 KHZ-1 MHz), generated internal to block 21, turns on a power switch 22 at the beginning of a switching cycle to charge an inductor 24. An internal oscillator generates a fixed frequency. When the switch 22 is turned off, sometime during the switching cycle, the voltage level at the floating end of the inductor 24 instantly rises, causing the diode 26 to become forward biased, and the stored inductor 24 energy is discharged into the capacitor 28 and load. The capacitor 28 smoothes the pulsed current to provide a DC output voltage. A resistor divider 30 creates a feedback voltage that is compared to a fixed reference voltage internal to the block 21. The resistor divider values set the output voltage (HVout). The block 21 controls the duty cycle of the switch 22 to cause the feedback voltage to match the internal reference voltage, using an error amplifier. Such regulators 20 are the most common type of boost regulator, and any other type of boost regulator can be used instead. The switch 22 may be on the same chip as the controller portion or external to the chip.

The regulator 20 would be a step-down regulator if Vin exceeds the desired output voltage.

Series LEDs

In the example of FIG. 2, there are anywhere from 15-72 LEDs 32 in each series string of LEDs. The strings may red, green, and blue LEDs, where the number of LEDs of each color and the current through the LEDs determine the overall white point for a backlight of a large LCD television.

If the voltage drop at the full current is 3.5 volts per LED, and a string has 72 LEDs, the regulator 20 would have to supply at least slightly greater than 252 volts to power the LEDs and ensure normal operation of the current control FETs 36 and 38. The same number of LEDs does not need to be in each string, since different colors of LEDs may have different voltage drops and some types of LEDs may be brighter than other types of LEDs. The number of LEDs in a string and the current through the string determine the overall brightness provided by that string. There may be any number of strings in parallel, such as 1-16.

A PWM waveform is externally generated by a microprocessor or any other circuit for controlling the average current through each of the strings of LEDs, typically for the purpose of controlling the brightness levels of the LED strings. An FET 36, 38 is connected in series between each string of LEDs and a low value resistor 40, 42 connected to ground.

Current Regulation Block 43

Each string of LEDs uses an associated current regulator comprising a FET 36/38, a resistor 40/42, an operational amplifier 44/45 (a type of differential amplifier), and a voltage reference circuit 46 controlled by a PWM signal 47. A voltage reference for each current regulator is created by an operational amplifier 48 receiving a fixed reference voltage Vref and a voltage determined by the current through a current set resistor RISET. The operational amplifier 48 controls an FET 50 such that the voltage drop across the resistor RISET equals Vref. A current mirror 52 generates the same or a proportional current through a resistor 54 for each current regulator, which results in a controlled voltage drop across each resistor 54 that is used as a reference voltage for each operational amplifier 44/45 in each current regulator The reference voltage produced by each resistor 54 is coupled to an input of the operational amplifier 44/45 by an FET 56/57, controlled by the PWM signal 47, described in more detail later. The FET 56/57 may be an n-channel or a p-channel and its gate voltage may be inverted or shifted, as required, to turn the FET 56/57 on or off.

When the FET 56/57 is turned on by a high PWM signal 47, the FET 36/38 is turned on to draw current through the LEDs, and a voltage is dropped across the resistor 40/42. The operational amplifier 44/45 controls the current through the FET 36/38 such that the voltages at the inputs of the operational amplifier 44/45 match. Therefore, the current when the FET 36/38 is on can be controlled by selecting the value of the resistor 40/42 (lower resistor value increases current). Each string can have a different resistor value to draw a different current through the LED string.

The magnitudes of all of the currents may be adjusted together by selecting the value of resistor RISET in the reference circuit, where a lower value RISET will increase the currents. The resistor RISET may even be a controllable rheostat. All of the resistor values are dependent on the types of LEDs used and the application.

PWM Management Blocks

The PWM Management Block 60 is powered by a low voltage (VDD), such as 5 volts. The block 60 receives an external PWM signal 61 for controlling the brightness levels of the LEDs. In one application, a microprocessor generates the PWM signal 61 to control the brightness of a backlight.

The block 60 controls the enablement of the power conversion block 21 and the state of the FETs 36/38 to ensure that the FETs 36/38 are not subjected to the high voltage (HVout) when the FETs 36/38 are turned off pursuant to the PWM signal. This allows the FETs 36/38 to be low voltage FETs. Such low voltage FETs (e.g., 15 volts or less) are small and can be put on the same chip as the remaining low voltage circuitry using low voltage semiconductor processing technology.

To avoid the FETs 36/38 experiencing the high voltage, the HV regulator 20 is disabled by block 60 shortly before the FETs 36/38 are turned off and is enabled shortly after the FETs 36/38 have been turned back on. The block 60 issues one PWM signal 47 to the current regulation block 43 and a different PWM signal 62 to the enable terminal (EN) of the power conversion block 21.

Figure 3:
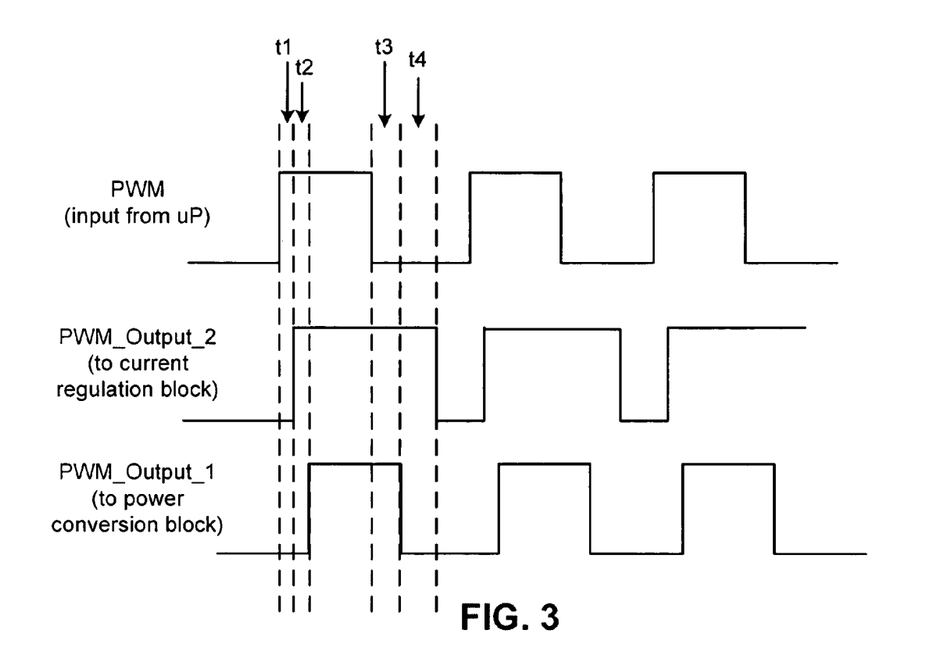
FIG. 3 illustrates an example of the relative timing of the incoming PWM signal and the PWM control signals for the HV regulator and current control transistor.
Figure 4:
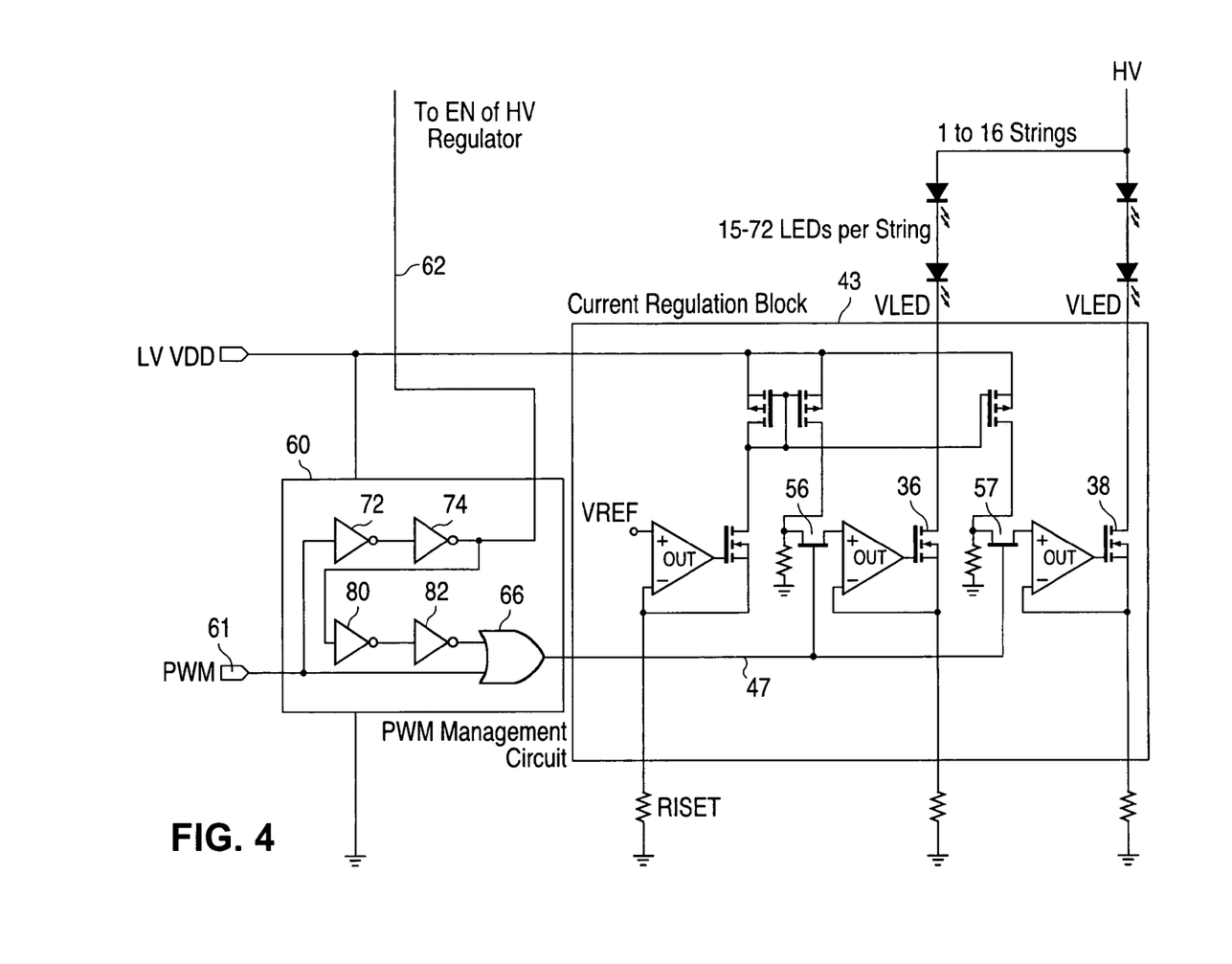
FIG. 4 illustrates circuit details of the PWM management block of FIG. 2.

FIG. 3 illustrates an example of the incoming PWM signal 61 and the two PWM signals 47 (PWM Output 2) and 62 (PWM Output 1) generated by the block 60. FIG. 4 illustrates one embodiment of a circuit within the block 60 that uses delay circuits and other logic to create the waveforms of FIG. 3 to prevent the FETs 36/38 from experiencing a high voltage (e.g., above 15 volts).

With reference to FIGS. 3 and 4, it is assumed that the incoming PWM signal 61 has just transitioned to a high state. As shown in FIG. 4, the incoming PWM signal 61 is not delayed for turning on the FETs 36/38. The PWM signal 61 is applied to an OR gate 66, and the output of the OR gate 66 (PWM signal 47) controls FETs 56/57 in the current regulation block 43 to turn on the FETs 36/38 prior to the HV regulator 20 being enabled. As seen in FIG. 3, the short delay incurred by the OR gate 66 is t1. For simplicity in the timing analysis, we will assume that the only components that cause a delay are the OR gate 66 and the various inverters, each adding a delay of t.

To create the PWM signal 62 for controlling the HV regulator 20, the incoming PWM signal 61 is always delayed by inverters 72 and 74 before the high signal is applied to the enable terminal of the HV regulator 20 to turn it on. The total delay before the HV regulator 20 is enabled is shown in FIG. 3 as t1+t2. Accordingly, it is assured that the FETs 36/38 will be on before the HV regulator 20 generates the high voltage so that the high voltage is never across the FETs 36/38.

When the incoming PWM signal 61 goes low, this low state is delayed by inverters 72, 74, 80, and 82 before turning off the FETs 56/57 and FETs 36/38 in the current regulation block 43. Accordingly, the FETs 36/38 will turn off after a delay equal to 5×t (OR gate 66 plus four inverters), shown as t3+t4 in FIG. 3. The HV regulator 20 will be disabled after only 2×t (shown as t3), since there are two inverters. Hence, the HV regulator 20 is guaranteed to turn off before the FETs 36/38 are turned off.

As a result, the on-time of the PWM waveform for controlling the FETs 36/38 encompasses the PWM waveform for enabling and disabling the HV regulator 20. The PWM waveform for controlling the FETs 36/38 will have a duty cycle higher than the enablement duty cycle of the HV regulator 20 (equal to the incoming PWM duty cycle).

Disablement of the regulator 20, due to the signal level at the EN terminal, may be by terminating power to the regulator components, such as the oscillator, causing the regulator switch 22 (FIG. 2) to remain in an off state. Most regulator chips have an enable or shutdown pin. The timing needs to take into account the charge stored in the output capacitor 28 of the regulator 20. Since the regulator 20 switching frequency will typically be on the order of 1 MHz, the capacitor 28 will be very small and quickly completely discharge through the LEDs after the regulator 20 has been disabled. The delay times in the PWM management circuit 60 will be significantly greater than the capacitor 28 discharge time, since the PWM frequency for controlling the FETs 36/38 will typically be on the order of 1 KHz.

Figure 5:
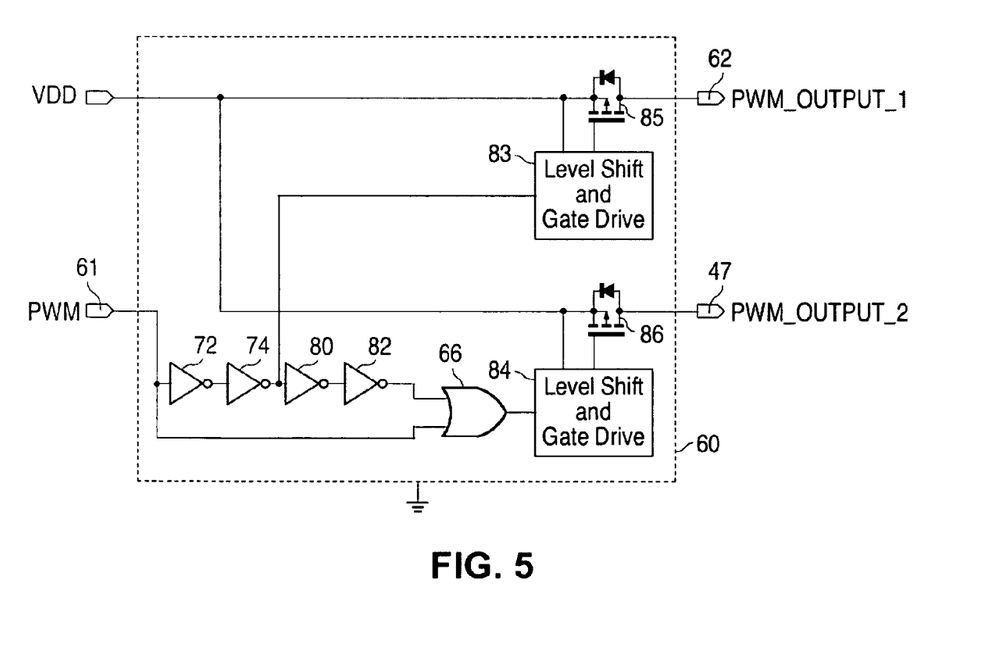
FIG. 5 is a circuit diagram of the PWM management block of FIG. 4, further illustrating level shifters, gate drivers, and pass transistors that may be incorporated in the logic circuitry of FIG. 4.

FIG. 5 illustrates the PWM management circuit of FIG. 4 using level shifters/gate drivers 83/84 and PMOS pass transistors 85/86 to supply a VDD voltage to the FETs 56/57 and enable terminal of the regulator in response to the incoming PWM signal 61 and logic if the normal output levels of the OR gate 66 and inverter 74 are not the desired levels. Such additional circuitry may be considered already incorporated in the OR gate 66 and inverter 74 of FIG. 4. The need for such circuitry depends on the type of FET 56/57 used and the required characteristic of the enable signal.

Figure 6:
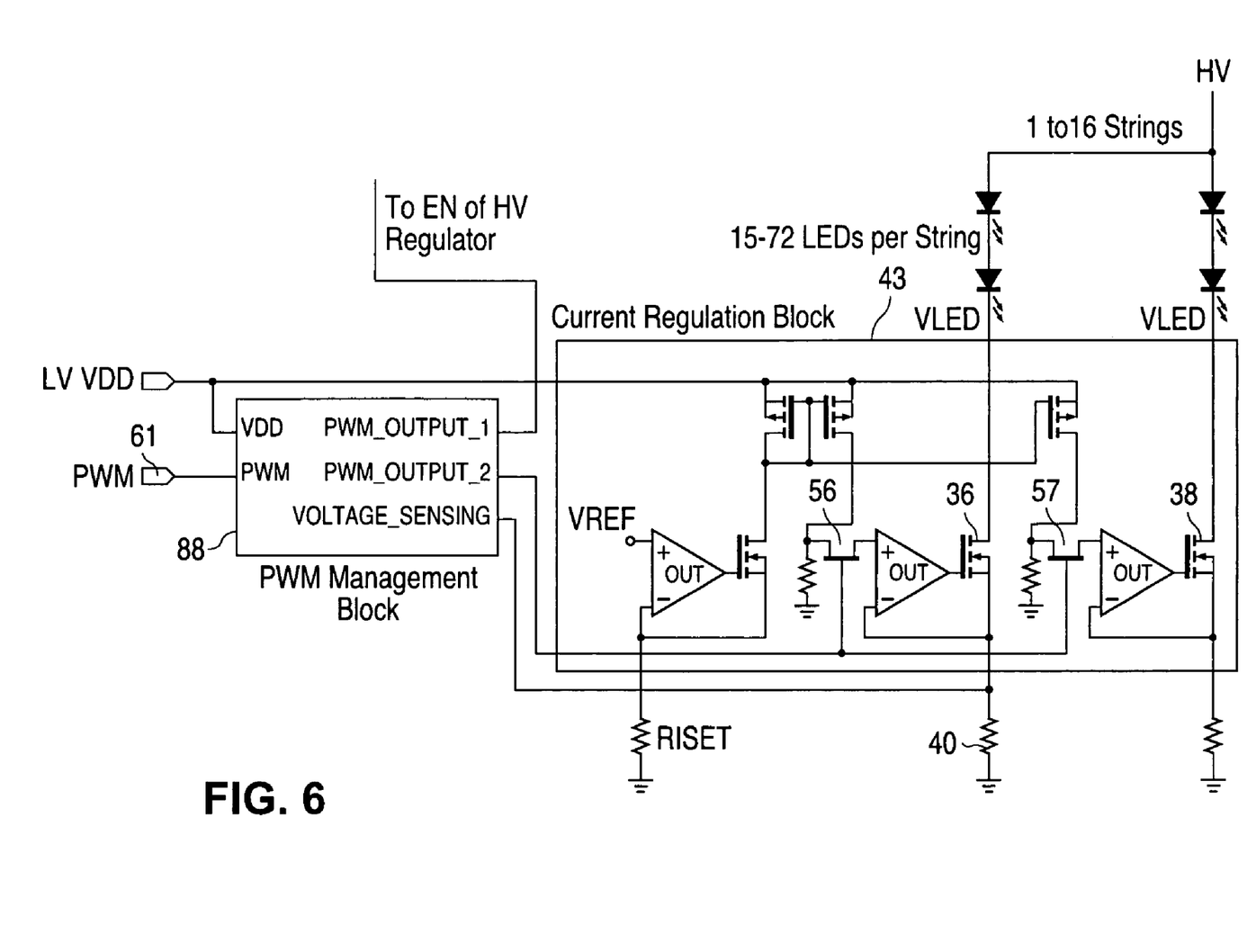
FIG. 6 is a high level circuit diagram of another embodiment of the invention using a delay circuit and a voltage sensing circuit.
Figure 7:
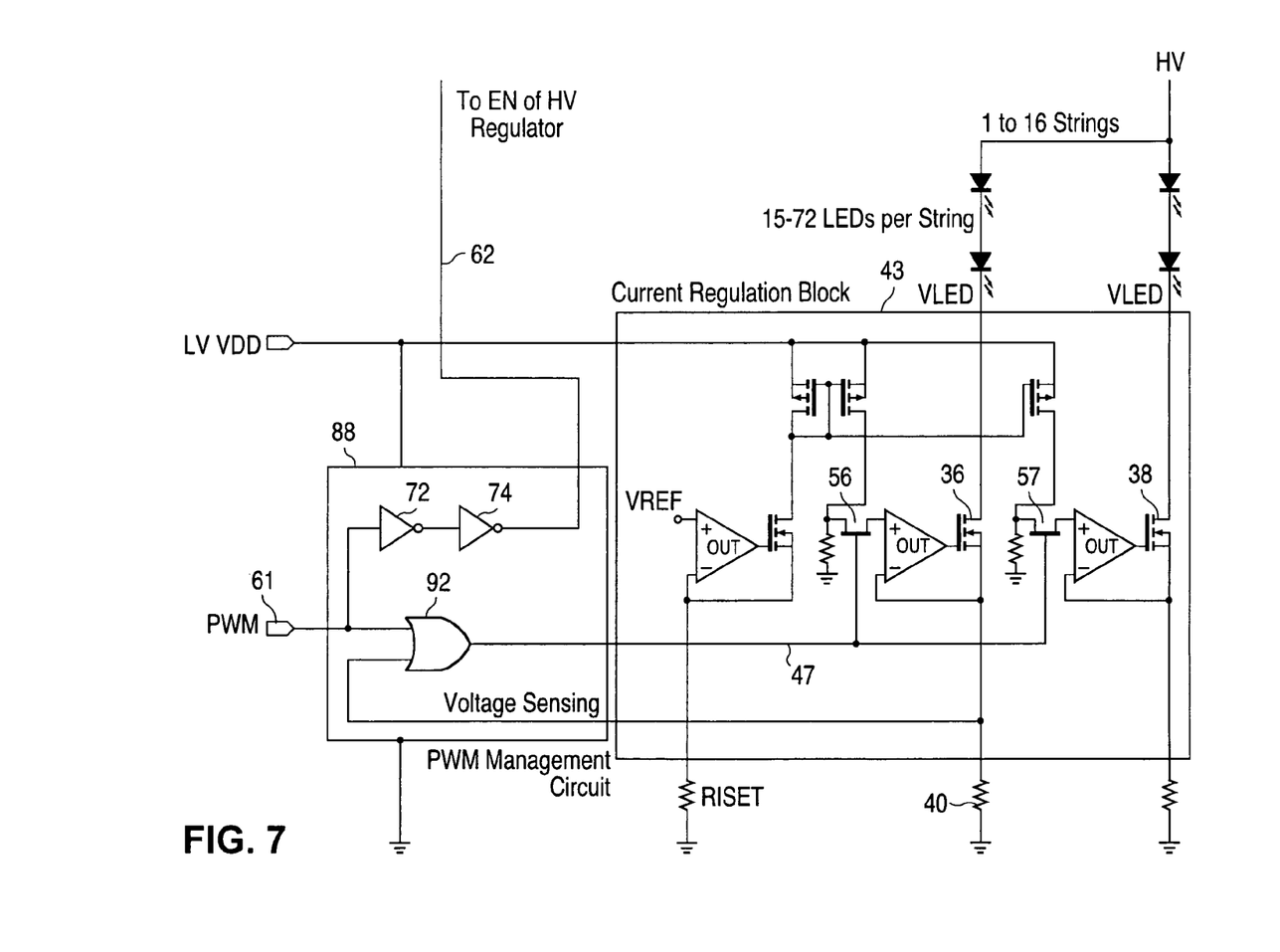
FIG. 7 illustrates circuit details of the PWM management block of FIG. 6.
Figure 8:
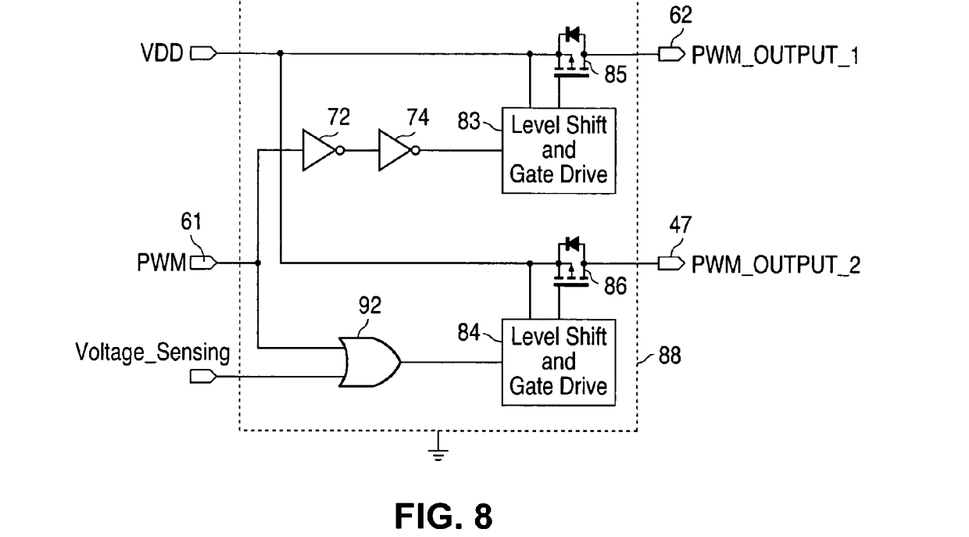
FIG. 8 is a circuit diagram of the PWM management block of FIG. 7, further illustrating level shifters, gate drivers, and pass transistors that may be incorporated in the logic circuitry of FIG. 7.

FIGS. 6-8 illustrate another embodiment of the PWM management block 88 that uses feedback voltage sensing to determine that the HV regulator 20 has been disabled before turning off the FETs 36/38. The regulators are not shown in subsequent embodiments, and the regulator may be the regulator 20 of FIG. 2 or any other regulator with an enablement terminal.

In FIG. 6, the voltage at resistor 40 is sensed to determine if there is current flowing through resistor 40. If so, the sensed voltage is high, meaning that the HV regulator is on and current is flowing through the LEDs, FET 36, and resistor 40. A high sensed voltage prevents the FETs 36/38 from being turned off even when the incoming PWM signal 61 is low. As shown in FIG. 7, this is achieved by applying the sensed voltage and the incoming PWM signal 61 to an OR gate 92. The OR gate 92 is selected so that its input high threshold voltage is lower than the LEDs' expected minimum forward current multiplied by the value of resistor 40 (i.e., the input high threshold is lower than the minimum voltage at resistor 40 when the HV regulator is on). The output of the OR gate 92 in FIG. 7 is applied to the gates of the FETs 56/57 for controlling the FETs 36/38, as previously described. A high PWM signal 61 will immediately turn on the FETs 36/38, assuming a trivial delay by the OR gate 92.

The incoming PWM signal 61 is delayed by inverters 72 and 74 for controlling the enablement/disablement of the HV regulator. Thus, the regulator will be enabled and disabled as shown in FIG. 3, where the FETs 36/38 will always turn on before the regulator is enabled and always turn off after the regulator is disabled. Using voltage sensing, rather than a fixed delay, reduces the delay in the FETs 36/38 turning off and adds reliability that the regulator voltage has indeed been terminated, even if a large output capacitor 28 (FIG. 2) is used.

FIG. 8 illustrates the PWM management block of FIG. 7 using level shifters/gate drivers 83/84 and pass transistors 85/86 for passing the VDD input voltage to the FETs 56/57 and enable terminal of the regulator. Such additional circuitry may be considered already incorporated in the OR gate 92 and inverter 74 of FIG. 7. The need for such circuitry depends on the type of FET 56/57 used and the required characteristic of the enable signal.

Figure 9:
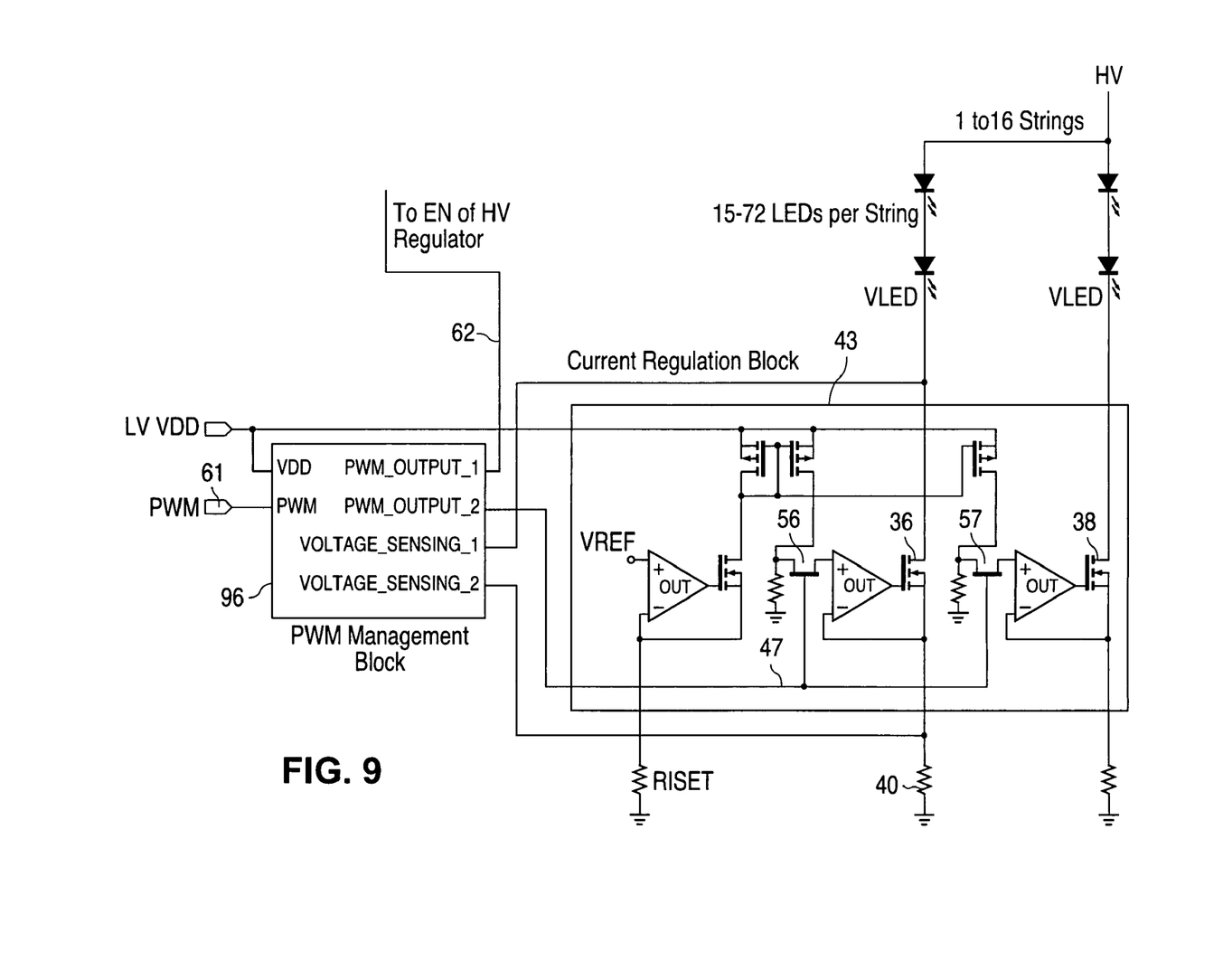
FIG. 9 is a high level circuit diagram of another embodiment of the invention using two voltage sensing circuits.
Figure 10:
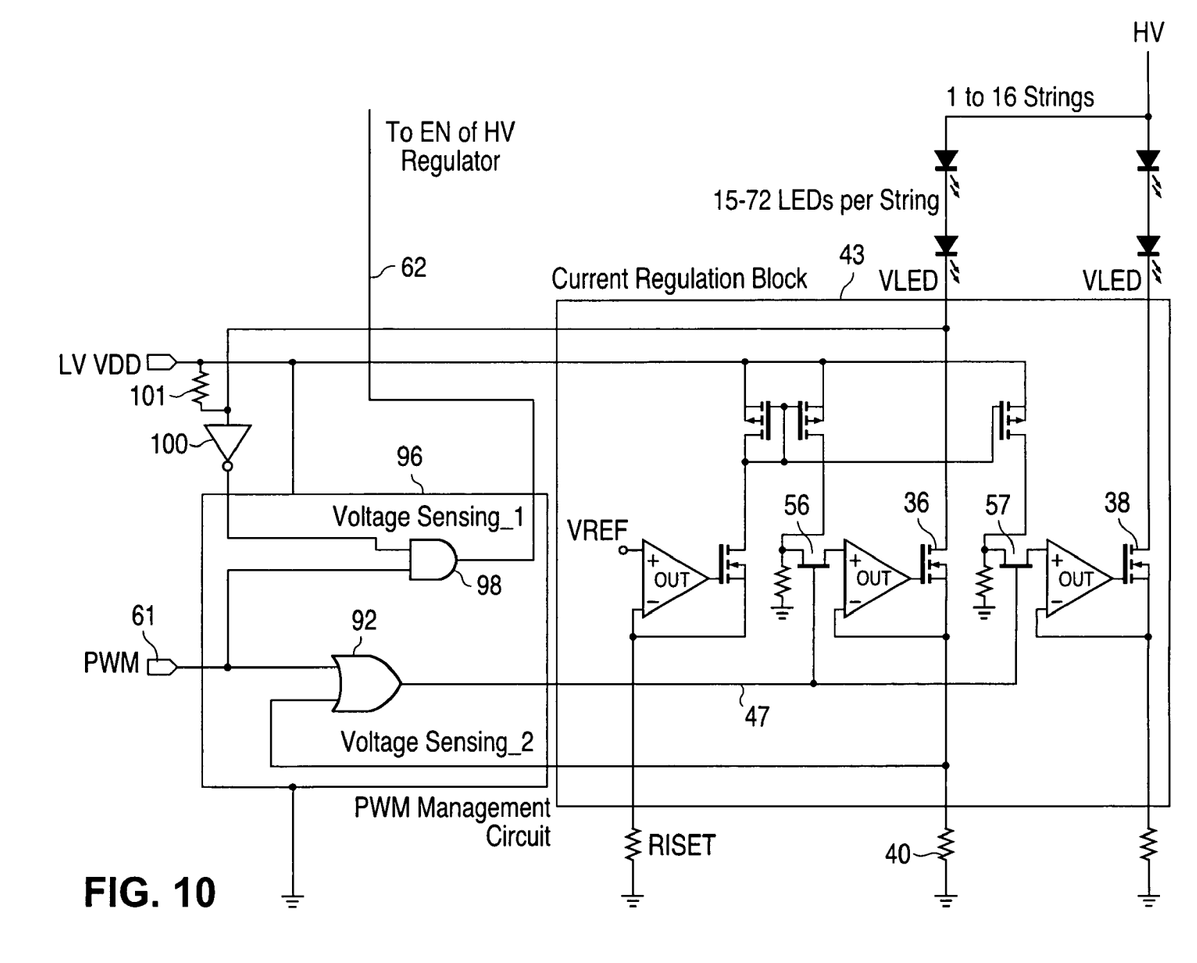
FIG. 10 illustrates circuit details of the PWM management block of FIG. 9.
Figure 11:
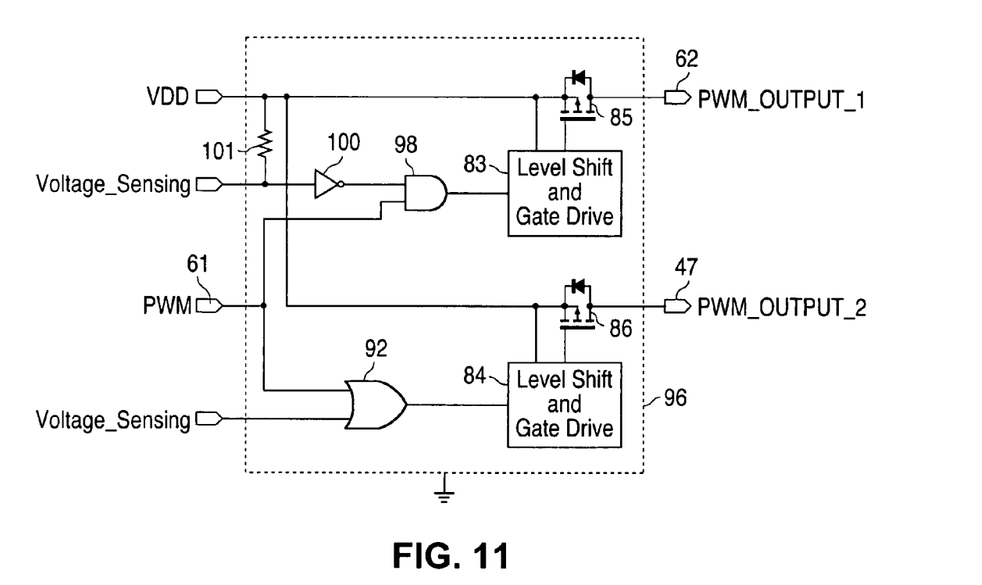
FIG. 11 is a circuit diagram of the PWM management block of FIG. 10, further illustrating level shifters, gate drivers, and pass transistors that may be incorporated in the logic circuitry of FIG. 10.

FIGS. 9-11 illustrate another embodiment of a PWM management block 96 similar to that of FIGS. 6-8 but further including high-side voltage sensing. The high-side voltage sensing prevents the regulator from being turned on if the FET 36 is off, meaning that the high-side sensed voltage is not being pulled to ground by the resistor 40. In FIG. 10, the incoming PWM signal 61 is applied to an AND gate 98 along with the voltage sense signal inverted by inverter 100. The inverter 100 is selected so that its input low threshold voltage is higher than the LEDs' expected maximum forward current multiplied by the sum of resistor 40 and the on-resistance of FET 36 (i.e., the input low threshold is higher than the maximum voltage at FET 36 when the HV regulator is on). If the incoming PWM signal 61 has just transitioned to a high state, and the FET 36 is still off, the inverted voltage sense signal will be pulled up to a logic high by a weak pull up resistor 101, and the output of the AND gate 98 will be logically low, causing the HV regulator to remain disabled. After the incoming PWM signal 61 turns on the FET 36, via the OR gate 92, the inverted sense signal will go high, since the high-side terminal is pulled to a logical low voltage, and the high output of the AND gate 98 will enable the HV regulator.

The low-side voltage sensing is the same as that described with respect to FIG. 7.

FIG. 11 illustrates the PWM management block 96 of FIG. 10 using level shifters/gate drivers 83/84 and pass transistors 85/86 for passing the VDD input voltage to the FETs 56/57 and enable terminal of the regulator. Such additional circuitry may be considered already incorporated in the OR gate 92 and AND gate 98 in FIG. 10. The need for such circuitry depends on the type of FET 56/57 used and the required characteristic of the enable signal.

Accordingly, in the embodiments of FIGS. 9-11, feedback is used to reliably prevent the FETs 36/38 from being off when the HV regulator is on.

All the control circuitry in the regulator, the PWM management block, and the current regulation block can be put on the same integrated circuit chip or in the same package since only low voltages are experienced by those circuits.

There are many types of delay circuits and feedback circuits that can be used instead of the circuits expressly shown to accomplish the function of not allowing the current control FETs to be off when a high voltage is being applied to the LEDs. There are many ways to disable a regulator, or terminate a high voltage to the current control FETs, and all such ways of terminating the HV voltage are considered to be an embodiment of the invention. The invention may be used to protect any type of switch, including bipolar transistors.

Having described the invention in detail, those skilled in the art will appreciate that, given the present disclosure, modifications may be made to the invention without departing from the spirit and inventive concepts described herein. Therefore, it is not intended that the scope of the invention be limited to the specific embodiments illustrated and described.

What is claimed is:

1. A system for driving a plurality of light emitting diodes (LEDs) in series comprising:
    a voltage regulator for receiving an input voltage and outputting a regulated output voltage at an output terminal sufficient to drive a series string of LEDs, the regulator having a first terminal for receiving a first pulse width modulation (PWM) signal having a first state to terminate the output voltage and having a second state to cause the output signal to be generated;
    a series string of LEDs having a first terminal at one end of the series string and a second terminal at an opposite end of the series string, the first terminal of the series string being electrically coupled to the output terminal of the regulator;
    a first transistor electrically coupled in series to the second terminal of the series string of LEDs for conducting a current through the series string of LEDs when the first transistor is on and when the voltage regulator is outputting the regulated output voltage; and
    a control circuit having an input terminal for receiving a second PWM signal for controlling an average brightness level of the series string of LEDs, the control circuit comprising logic circuitry providing the first PWM signal to the first terminal of the voltage regulator and providing a third PWM signal to turn the first transistor on and off at a certain duty cycle,
    the logic circuitry being configured to generate the first PWM signal and the third PWM signal so that the first transistor is always on prior to the regulated output voltage of the voltage regulator being applied to the string of LEDs and so that the regulated output voltage is not applied to the string of LEDs when the first transistor is off.

2. The system of claim 1 wherein the first transistor is connected between the second terminal of the series string of LEDs and a first terminal of a resistor, a second terminal of the resistor being connected to ground.

3. The system of claim 1 further comprising a current regulator receiving the third PWM signal and causing the first transistor to turn on and off in response to the third PWM signal.

4. The system of claim 1 wherein a duty cycle of the first PWM signal for controlling the regulated output voltage is approximately equal to a duty cycle of the second PWM signal, and a duty cycle of the third PWM signal for controlling the first transistor is greater than the duty cycle of the first PWM signal.

5. The system of claim 1 wherein the logic circuitry of the control circuit comprises a delay circuit for delaying the second PWM signal to generate the first PWM signal for controlling the regulated output voltage.

6. The system of claim 1 wherein the logic circuitry of the control circuit comprises a delay circuit for delaying the second PWM signal to generate the third PWM signal for controlling the first transistor.

7. The system of claim 1 wherein the logic circuitry of the control circuit comprises a voltage sensing circuit for detecting whether the voltage regulator is outputting the regulated output voltage while the first transistor is on, wherein the voltage sensing circuit prevents the second PWM signal from turning off the first transistor while the regulator is outputting the regulated output voltage.

8. The system of claim 7 wherein the voltage sensing circuit comprises a resistor connected in series between the first transistor and ground, and comprises an OR gate having one input connected to receive the second PWM signal and another input connected to receive a voltage at the resistor, an output of the OR gate being connected to turn on or off the first transistor.

9. The system of claim 1 wherein the logic circuitry of the control circuit comprises a voltage sensing circuit for detecting whether the first transistor is off, wherein the voltage sensing circuit prevents the second PWM signal from causing the regulator to output the regulated output voltage when the first transistor is off.

10. The system of claim 1 wherein the first PWM signal enables and disables the voltage regulator.

11. The system of claim 1 wherein the regulator is a boost regulator generating a voltage greater than 15 volts.

12. A circuit for controlling enablement and disablement of a voltage regulator driving a plurality of light emitting diodes (LEDs) in series, and for controlling a first transistor in series with the LEDs for turning the LEDs on an off, the circuit comprising:
   a first circuit for generating a first pulse width modulation (PWM) signal and applying the first PWM signal to an enablement terminal of the voltage regulator for either enabling or disabling the regulator depending on a state of the first PWM signal, the first circuit generating the first PWM signal in response to a second PWM signal; and
   a second circuit for generating a third PWM signal and applying the third PWM signal to the first transistor to either turn on the first transistor or turn off the first transistor depending on a state of the third PWM transistor,
   the first circuit and the second circuit being configured to generate the first PWM signal and the third PWM signal so that the first transistor is always on prior to the regulated output voltage of the voltage regulator being applied to the string of LEDs and so that the regulated output voltage is not applied to the string of LEDs when the first transistor is off.

13. The circuit of claim 12 wherein the first transistor is connected between the LEDs and a first terminal of a resistor, a second terminal of the resistor being connected to ground.

14. The circuit of claim 12 further comprising a current regulator receiving the third PWM signal and causing the first transistor to turn on and off in response to the third PWM signal.

15. The circuit of claim 12 wherein a duty cycle of the first PWM signal for controlling the regulated output voltage is approximately equal to a duty cycle of the second PWM signal, and a duty cycle of the third PWM signal for controlling the first transistor is greater than the duty cycle of the first PWM signal.

16. The circuit of claim 12 wherein the first circuit comprises a delay circuit for delaying the second PWM signal to generate the first PWM signal for enabling and disabling the regulator.

17. The circuit of claim 12 wherein the second circuit comprises a delay circuit for delaying the second PWM signal to generate the third PWM signal for controlling the first transistor.

18. The circuit of claim 12 wherein the second circuit comprises a voltage sensing circuit for detecting whether the voltage regulator is outputting the regulated output voltage while the first transistor is on, wherein the voltage sensing circuit prevents the second PWM signal from turning off the first transistor while the regulator is outputting the regulated output voltage.

19. The circuit of claim 18 wherein the voltage sensing circuit comprises a resistor connected in series between the first transistor and ground, and an OR gate having one input connected to receive the second PWM signal and another input connected to receive a voltage at the resistor, and output of the OR gate being connected to turn on or off the first transistor.

20. The circuit of claim 12 wherein the first circuit comprises a voltage sensing circuit for detecting whether the first transistor is off, wherein the voltage sensing circuit prevents the second PWM signal from causing the regulator to output the regulated output voltage when the first transistor is off.

21. A method for driving a plurality of light emitting diodes (LEDs) in series comprising:
   generating a regulated output voltage by a voltage regulator at an output terminal sufficient to drive a series string of LEDs connected to the output terminal, the regulator having an enable terminal receiving a first pulse width modulation (PWM) signal having a first state to disable the regulator and having a second state to enable the regulator, the first PWM signal being generated in response to a second PWM signal;
   controlling a first transistor with a third PWM signal, the first transistor being connected in series with the series string of LEDs for conducting a current through the series string of LEDs when the first transistor is on and when the voltage regulator is enabled; and
   receiving the second PWM signal by a control circuit for turning the first transistor on and off at a certain duty cycle for controlling an average brightness level of the series string of LEDs, the control circuit generating the first PWM signal and the third PWM signal so that the first transistor is always on prior to the voltage regulator being enabled by the first PWM signal, and the voltage regulator is always disabled when the first transistor is off.

22. The method of claim 21 wherein a duty cycle of the first PWM signal for enabling and disabling the voltage regulator is approximately equal to a duty cycle of the second PWM signal, and a duty cycle of the third PWM signal for controlling the first transistor is greater than the duty cycle of the first PWM signal.

23. The method of claim 21 wherein the control circuit generating the first PWM signal and the third PWM signal comprises delaying the second PWM signal to generate one or both of the first PWM signal, for enabling and disabling the regulator, and the third PWM signal, for controlling the first transistor.

24. The method of claim 21 wherein the control circuit generating the first PWM signal and the third PWM signal comprises sensing a voltage for detecting whether the voltage regulator is outputting the regulated output voltage while the first transistor is on, and preventing the second PWM signal from turning off the first transistor while the regulator is outputting the regulated output voltage.

25. The method of claim 21 wherein the control circuit generating the first PWM signal and the third PWM signal comprises sensing a voltage for detecting whether the first transistor is on or off, wherein, if it is sensed that the first transistor is off, preventing the second PWM signal from causing the regulator to be enabled.

* * * * *